(12) United States Patent
Spies et al.

(10) Patent No.: US 7,580,521 B1
(45) Date of Patent: Aug. 25, 2009

(54) IDENTITY-BASED-ENCRYPTION SYSTEM WITH HIDDEN PUBLIC KEY ATTRIBUTES

(75) Inventors: Terence Spies, Palo Alto, CA (US); Rishi R. Kacker, Menlo Park, CA (US); Guido Appenzeller, Menlo Park, CA (US); Matthew J. Pauker, Menlo Park, CA (US)

(73) Assignee: Voltage Security, Inc., Palo Alto, CA (US)

( * ) Notice: Subject to any disclaimer, the term of this patent is extended or adjusted under 35 U.S.C. 154(b) by 693 days.

(21) Appl. No.: 10/606,432

(22) Filed: Jun. 25, 2003

(51) Int. Cl.
*H04L 9/00* (2006.01)

(52) U.S. Cl. .................. 380/44; 380/281; 380/282; 380/284

(58) Field of Classification Search ............ 380/281, 380/284, 44, 282
See application file for complete search history.

(56) References Cited

U.S. PATENT DOCUMENTS

| | | | |
|---|---|---|---|
| 5,016,276 A | 5/1991 | Matumoto et al. | |
| 5,159,632 A | 10/1992 | Crandall | |
| 5,271,061 A | 12/1993 | Crandall | |
| 5,272,755 A | 12/1993 | Miyaji et al. | |
| 5,581,616 A | 12/1996 | Crandall | |
| 5,850,443 A * | 12/1998 | Van Oorschot et al. | 380/285 |
| 6,061,448 A | 5/2000 | Smith et al. | |
| 6,154,541 A * | 11/2000 | Zhang | 380/28 |
| 6,952,769 B1 * | 10/2005 | Dubey et al. | 713/153 |
| 6,986,036 B2 * | 1/2006 | Wang et al. | 713/153 |
| 7,003,667 B1 * | 2/2006 | Slick et al. | 713/182 |
| 7,016,499 B2 * | 3/2006 | Perlman | 380/281 |
| 7,113,594 B2 * | 9/2006 | Boneh et al. | 380/28 |
| 7,131,003 B2 * | 10/2006 | Lord et al. | 713/168 |
| 7,175,568 B2 * | 2/2007 | Eschenbach | 482/52 |
| 7,200,230 B2 * | 4/2007 | Knauft | 380/201 |
| 2002/0076042 A1 | 6/2002 | Sandhu et al. | |
| 2003/0179885 A1 * | 9/2003 | Gentry et al. | 380/277 |
| 2003/0198348 A1 * | 10/2003 | Mont et al. | 380/277 |

FOREIGN PATENT DOCUMENTS

WO    WO 02/51066 A1    6/2002

OTHER PUBLICATIONS

Jeremy Horwitz, Toward Hierarchical Identity-Based Encryption, 2002, EUROCRYPT 2002, LNCS 2332, pp. 466-481.*
Boneh, Identity-Based Encryption from the Weil Pairing, 2001, Advances in Cryptology—Crypto 2001, LNCS 2139, pp. 213-229.*
Jeremy Horwits and Ben Lynn, "Toward Hierarchical Identity-Based Encryption," Advances in Cryptology: EUROCRYPT 2002, Lecture Notes in Computer Science, vol. 2332, pp. 466-481, 2002.
Xuejia Lai and James L. Massey,"A Proposal for a New Block Encryption Standard," Advances in Cryptology—EUROCRYPT '90, pp. 389-404, Proceedings, LNCS 473, Springer-Verlag, 1991.

* cited by examiner

*Primary Examiner*—Benjamin E Lanier
(74) *Attorney, Agent, or Firm*—Treyz Law Group; G. Victor Treyz

(57) ABSTRACT

A system is provided that uses identity-based encryption (IBE) to allow a sender to securely convey information in a message to a recipient over a communications network. IBE public key information may be used to encrypt messages and corresponding IBE private key information may be used to decrypt messages. Information on which IBE public key information was used in encrypting a given message may be provided to the message recipient with the message. Multiple IBE public keys may be used to encrypt a single message. A less sensitive IBE public key may be used to encrypt a more sensitive public key, so that the more sensitive public key can remain hidden as it is sent to the recipient.

28 Claims, 6 Drawing Sheets

DATA STRUCTURE

```
<MOVIE>
<SUBSCRIBER_NO NO=24286671/>
<RATING NC-17>\
<TITLE  "MOVIE NAME"/>
<REGION R="US"/>
      •
      •
      •
</MOVIE>
```
~52

```
<IBE_POLICY_ATTRIBUTE_RECORD>
<TYPE T = "MOVIE"/>
<FIELD F="SUBSCRIBER NO."; POLICY = "VIEWER SUBSCRIBER NO. MUST MATCH";
                                           SENSITIVITY = "NONE"/>
 <FIELD F = "RATING"; POLICY = "MUST BE OLD ENOUGH TO VIEW RATING";
                                           SENSITIVITY = "HIGH"/>
</IBE_POLICY_ATTRIBUTE_RECORD>
```

FIG. 6

IDENTITY-BASED-ENCRYPTION SYSTEM WITH HIDDEN PUBLIC KEY ATTRIBUTES

BACKGROUND OF THE INVENTION

This invention relates to cryptographic systems, and more particularly, to identity-based-encryption systems.

Cryptographic systems are used to provide secure communications services such as secure email services and secure content distribution services. In providing these services, various messages must be securely conveyed between different parts of the system. For example, in a secure email system, a secure email message must be conveyed from a sender to a recipient. In secure content distribution environments, a service provider may distribute media files to subscribers in the form of encrypted messages.

With symmetric key cryptographic systems, the sender of a message uses the same key to encrypt the message that the recipient of the message uses to decrypt the message. Symmetric-key systems require that each sender and recipient exchange a shared key in a secure manner.

With public-key cryptographic systems, two types of keys are used—public keys and private keys. Senders may encrypt messages using the public keys of the recipients. Each recipient has a private key that is used to decrypt the messages for that recipient.

One public-key cryptographic system that is in use is the RSA cryptographic system. Each user in this system has a unique public key and a unique private key. A sender may obtain the public key of a given recipient from a key server over the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message. Public key encryption systems such as the RSA system that use this type of traditional approach are referred to herein as PKE cryptographic systems.

Identity-based-encryption (IBE) systems have also been proposed. As with PKE cryptographic systems, a sender in an IBE system may encrypt a message for a given recipient using the recipient's public key. The recipient may then decrypt the message using the recipient's corresponding private key. The recipient can obtain the private key from a private key generator associated with the recipient. Unlike PKE schemes, IBE schemes generally do not require the sender to look up the recipient's public key. Rather, a sender in an IBE system may generate a given recipient's IBE public key based on known rules. For example, a message recipient's email address or other identity-based information may be used as the recipient's public key, so that a sender may create the IBE public key of a recipient by simply determining the recipient's email address.

In addition to or instead of using identity-based information, more generally applicable policy-based information may be used to form the IBE public key. As an example, a one-week expiration period may be imposed on all encrypted messages. This expiration date policy may be used to form the IBE public key (e.g., by basing the IBE public key on a date stamp). As another example, a ratings policy might specify that only subscribers greater than a certain age may access the content of the message. The rating value associated with a given message may be used to form the IBE public key for that message. Recipients must satisfy the policy constraints set forth in the IBE public key before they can access the encrypted message content.

A given message recipient may have relationships with multiple private key generators and therefore may have multiple associated IBE public-private key pairs. Such a recipient may receive a number of messages from various senders each encrypted using a different one of the recipient's IBE public keys and each requiring a different one of the recipient's IBE private keys for decryption.

It may therefore be desirable for senders to provided recipients with information on which IBE public key was used to encrypt a given message. For example, senders can send both the encrypted message data and a copy of the IBE public key used to encrypt that message data to a recipient at the same time. The recipient can use the IBE public key that is received from the sender to determine which IBE private key to use in decrypting the message.

Sometimes, however, the IBE public key itself may contain sensitive information. For example, the IBE public key may reveal the rating that was associated with a particular IBE-encrypted movie the recipient received from a service provider or the IBE public key may reveal sensitive information regarding which portion of an organization the recipient is associated with or which sensitive projects the recipient is working on.

It is therefore an object of the present invention to provide improved ways in which message recipients can be provided with potentially sensitive IBE public key information for use in message decryption.

SUMMARY OF THE INVENTION

In accordance with the present invention, an identity-based-encryption (IBE) system is provided in which a sender may encrypt messages for a recipient using multiple layers of IBE encryption. Each layer uses an associated IBE public key for encryption at the sender and an corresponding IBE private key for decryption at the recipient. A message may be encrypted using two-layers of IBE encryption or using three or more layers of IBE encryption. One or more symmetric message keys may be used for encryption within each IBE-encryption layer to improve the efficiency of the encryption process.

The encrypted message contents and the encrypted versions of the IBE public keys (and any symmetric keys that are used) may be sent to the recipient with the message. Providing the IBE public keys to the recipient assists the recipient in locating the correct private key generator from which to obtain the corresponding IBE private keys. As the recipient decrypts each layer of the message, another IBE public key is revealed. This IBE public key may be used to obtain its corresponding IBE private key, which may in turn be used to decrypt the next layer of the message.

Some of the IBE public keys may contain information that is more sensitive than others. It may be harmful or embarrassing if sensitive information is intercepted by an attacker or other third party. The more sensitive IBE public keys may be used for the inner layers of encryption and may be encrypted using other, less-sensitive IBE public keys. This arrangement conceals the values of the sensitive innermost IBE public keys from view, even if the encrypted message that is sent to the recipient contains copies of some or all of the IBE public keys.

Each time the recipient uses an IBE public key to query a private key generator for a corresponding IBE private key, the private key generator may use access policy information in the IBE public key to determine whether or not the recipient is authorized to obtain a copy of the requested IBE private key. The access policy information may be in the form or a recipient identity or a more generally applicable access policy or may be based on a combination of such criteria. The recipient may provide recipient credentials to the private key generator to prove to the private key generator that the recipient satisfies the access policy constraints imposed by the public key and is therefore authorized to obtain the private key.

The data to be encrypted and distributed in the encrypted messages sent between senders and recipients may be any suitable data such as video, audio, text, images, code, etc. Message data may be provided to a sender (e.g., a service provider or other sender) in the form of a data structure. For example, the sender may be provided with or may construct the message data in the form of an XML data structure.

The message data may have associated data attributes. For example, a movie may have associated data attributes such as rating, title, genre, director, subscriber number, authorized geographic region, authorized validity period, etc. The data attributes may be used with associated access policy information to generate the IBE public keys. For example, a movie may have associated data attributes of "subscriber number=123456" and "rating=R" and associated access policies "viewer subscriber number must match to view" and "viewer must be old enough to view content of this rating."

A less-sensitive outer-layer IBE public key may be formed that is based on the subscriber number and subscriber number access policy. A more-sensitive inner-layer IBE public key may be formed that is based on the rating and the ratings access policy. Information on the sensitivity level associated with each data attribute in the data structure may be provided to the sender in the form of an XML IBE policy attribute record or other suitable format.

During the encryption process (in this example), the movie may be encrypted in an inner layer of IBE encryption using the more-sensitive (ratings-based) inner-layer IBE public key. The more-sensitive (ratings-based) inner-layer IBE public key may then be encrypted using the less-sensitive (subscriber-number-based) outer-layer IBE public key. The less-sensitive outer-layer IBE public key may be transmitted to the recipient in the clear with the encrypted message. Because the less-sensitive outer-layer IBE public key does not include overly-sensitive information, it is acceptable to transmit this information in unencrypted form. The less-sensitive outer-layer IBE public key may be used by the recipient to obtain the corresponding outer-layer IBE private key.

The more-sensitive (ratings-based) IBE public key may be transmitted in its encrypted form to the recipient with the encrypted message. Because the more-sensitive IBE public key is encrypted (using the outer-layer key), the sensitive information contained in the more-sensitive IBE public key is not sent in the clear and is concealed from the public.

Once the recipient has used the less-sensitive outer-layer IBE public key to obtain the outer-layer IBE private key, the recipient may decrypt the encrypted-version of the more-sensitive inner-layer (ratings-based) IBE public key. This public key may be used to obtain the corresponding IBE inner-layer private key. The inner-layer IBE private key may be used to decrypt the message data for the recipient.

If desired, three or more layers of IBE encryption may be used. Moreover, the less-sensitive outer-layer IBE public keys may be made up of some of the same IBE public key components as the inner-layer IBE public keys. Overlapping the public keys in this way may reduce the overhead associated with implementing the multi-layer IBE encryption scheme. The outer layer and inner layer keys may, if desired, be nested, so as one progresses from the innermost IBE encryption layer to the outermost IBE encryption layer, the IBE public keys are each nested one in the other with each progressively more outward key including fewer IBE public key components than the previous one.

In general, any suitable IBE public keys may be used for each layer, whether overlapping or distinct and whether or not some or all of the information in one layer's IBE public key is more or less sensitive than some or all of the information in another layer's IBE public key. To maintain the secrecy of a recipient's sensitive public key information, the most sensitive IBE public key information is preferably concealed in the innermost layers of the encrypted message by IBE encryption. If desired, one or more symmetric keys may be used within each IBE-encryption layer to improve the efficiency of the encryption process. For example, the innermost layer of IBE encryption of a message may be performed by encrypting the message data using a symmetric key and then encrypting the symmetric key using an inner-layer IBE public key.

Further features of the invention, its nature and various advantages will be more apparent from the accompanying drawings and the following detailed description of the preferred embodiments.

BRIEF DESCRIPTION OF THE DRAWINGS

FIG. 5 is a diagram of an illustrative data structure having data to be encrypted and associated data attributes in accordance with the present invention.

FIG. 6 is a diagram of an illustrative data record that may be used to specify how sensitive various data structure attributes are and how such data structure attributes are to be used in encrypting data using multiple layers of IBE encryption in accordance with the present invention.

DETAILED DESCRIPTION OF THE PREFERRED EMBODIMENTS

Figure 1:
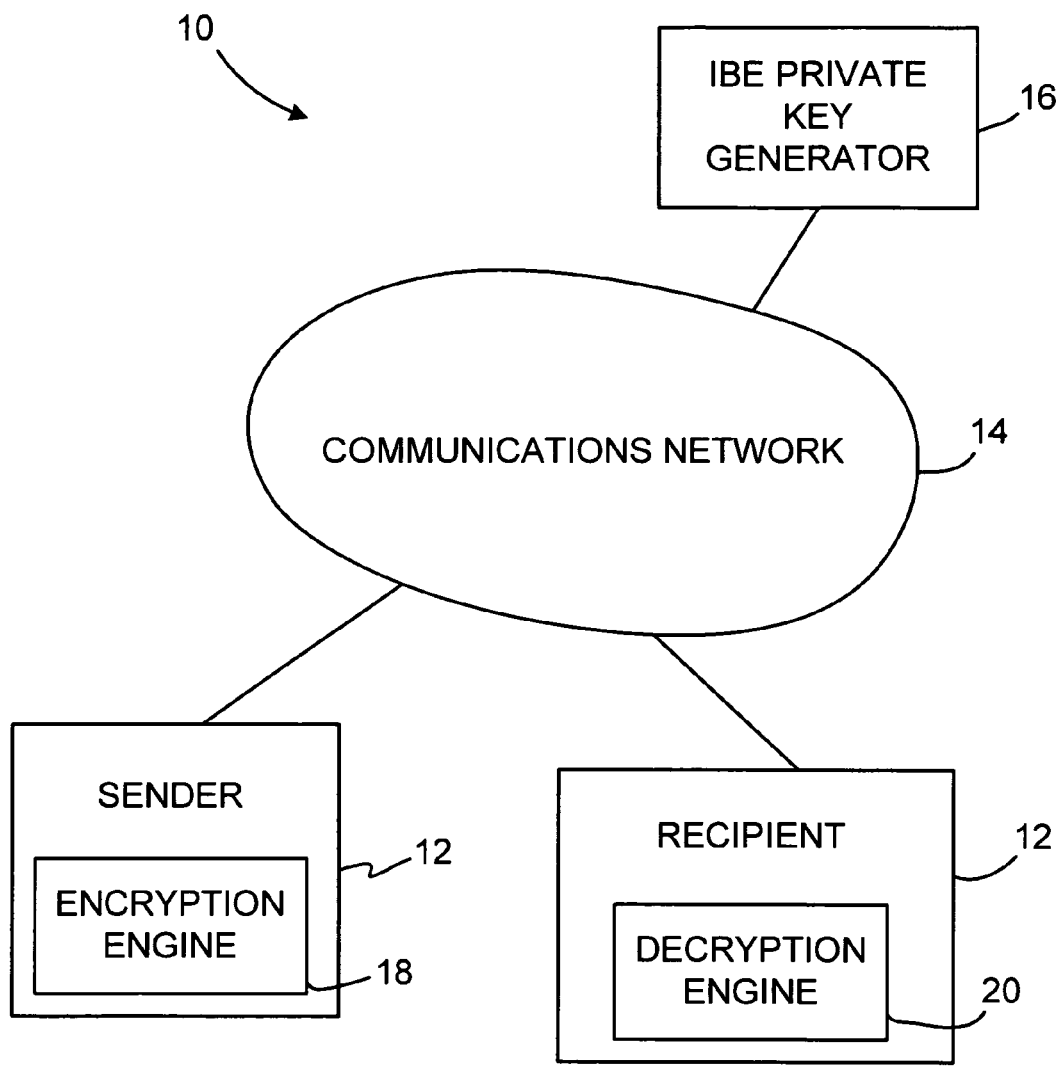
FIG. 1 is a diagram of an illustrative identity-based-encryption system in accordance with the present invention.

An illustrative identity-based-encryption (IBE) system 10 that may be used to support secure messaging is shown in FIG. 1. A user may send a secure message to one or more other users over a communications network 14. The users in the systems described herein may be individuals, organizations, parts of organizations, or any other suitable parties or entities. Users who are sending messages are called senders. Users receiving messages are called recipients. The messages may include any digital information (e.g., text, graphics, audio, video, commands, executable code, data, etc.) that it is desired to convey electronically between senders and recipients in a secure manner.

Users may communicate with each other using equipment 12. Equipment 12 may, for example, include computing equipment such as a personal computers, portable computers, mainframe computers, networked computers or terminals, telecommunications equipment, handheld computers or personal digital assistants, or cellular telephones. Multiple individuals or organizations may use the same device. For example, a group of workers in an office may share the use of a single computer terminal that is connected to a host computer in a local area network. In some environments, the senders and recipients may use router equipment or other such network equipment to send and receive messages related to network set-up and maintenance. These are merely illustrative examples of the type of platforms that system 10 may use. Equipment 12 may be based on any suitable electronic equipment if desired.

The equipment of FIG. 1 may be interconnected by communications paths in a communications network 14. Network 14 may be, for example, the Internet, a local area network, a wide area network, the public switched telephone network, a virtual private network, a wired network, a wireless network, a network including dedicated leased lines, a network based on fiber-optic or cable paths or other wired or wireless paths, or a network formed using any other suitable network technology or a combination of such networks.

Various computing devices may be used with network 14 to support secure messaging features. The location of such computing equipment (i.e., whether the computing equipment is considered to be within or part of network 14 or is considered to be connected to network 14 from another location) is generally not critical. For example, computing equipment may be used to implement the functions of a server or other computer equipment at each IBE private key generator 16. Servers may also be used to support the functions of an IBE public parameter directory, an IBE public parameter host, a certificate authority, or other entities. Such servers may be co-located with a sender, may be connected to the network 14 as an independent third party service, may be part of the infrastructure of network 14, may be associated with a given recipient's organization, may be co-located with the recipient, private key generator, or other equipment, or may used at more than one of these locations. These are merely illustrative arrangements which need not be mutually exclusive.

A server may be formed using a single computer or multiple computers. Multiple servers may be implemented on one computer. If desired, the functions of a single server may be provided by computers that are distributed over a number of different physical locations. The functions implemented using servers in system 10 may generally be performed using other computer equipment configurations if desired, but the computing equipment for implementing these functions is generally referred to as a "server" or "servers" for clarity.

A sender may send a message to a given recipient over system 10 using any suitable messaging format. For example, an email message, an instant message (e.g., an AOL instant message, a Yahoo instant message, an MSN Messenger instant message, and ICQ instant message, an IBM/Lotus Sametime instant message, etc.), or other electronic messages (e.g., messages sent between network equipment such as ICMP messages or messages sent between corporate IT systems, etc.) may be sent. Email messages may be used in contexts in which the widespread acceptance of the standard email format is important. Instant messages are generally limited in size, but may be delivered with less delay (e.g., less than a second) than email messages (which are typically delivered in less than one minute). Most instant messages are currently transported using insecure protocols.

Messages may be used to securely distribute digital content such as video and audio multimedia content from a service provider to various users in the system. The users may, for example, be subscribers to a service offered by the service provider. In this type of environment, the service provider is a sender of messages (e.g., encrypted movies and songs) and the subscribers are message recipients.

For clarity, the present invention is sometimes described in the context of particular types of messages (e.g., email messages or movie files). These are merely illustrative messages. Any suitable type of messages may be conveyed between senders and receivers if desired.

Some user activities in system 10, such as sending person-to-person email messages, involve at least some manual intervention. For example, a person who desires to send a personally-composed text message must type the message before it is encrypted and sent to the appropriate recipient.

Other user activities in system 10 may be entirely automated so that no human intervention is generally required. As one example, the user at one device 12 may be a banking institution that desires to use encrypted communications to deliver encrypted bank statements to account holders at other devices 12 over communications network 14. The statement preparation and distribution processes may be automated so that no operator intervention is generally needed at the banking institution's equipment once the system has been properly set up. User receipt of the statements may also be automated. As another example, devices 12 may be routers or other network equipment devices that autonomously exchange messages related to network setup and maintenance operations. In this scenario, the routers (or the parts of the network associated with the routers) serve as the senders and recipients in the system.

System functions involved in presenting on-screen options for humans to respond to (e.g., by clicking on them using a computer mouse) can be automated using software running on the components of the system. Whether a particular function involves manual intervention or a computer-implemented operation will be clear from context in the following discussion.

During certain operations of system 10, certain entities (e.g., private key generators such as private key generator 16) may need to verify that a given party has permission to access the contents of a particular message or to perform certain functions. In general, the entity performing such authentication and authorization processes may use any suitable manual or automatic techniques. For example, a party may be asked to fax or mail a letter to an authenticating entity on the party's official letterhead, which is examined for authenticity by personnel or automated equipment at the authenticating entity. As another example, biometric identification techniques (e.g., fingerprint analysis, eye-scanning, handprint or voiceprint analysis, facial recognition methods, or in-person identification checks) may be used. Hardware-based arrangements (e.g., based on hardware tokens) may be used to establish identity. A user may provide credentials in the form of a pre-established user name and password. Certificate authorities may create digital certificates that help to verify the identities of certain parties. Digital signatures (e.g., signatures from a certificate authority or other entity that use PKE private keys and that can be verified using matching PKE public keys) may be used to ensure that a message or other signed information is associated with a particular party.

Sometimes authentication information and other information (in addition to the messages being sent from the senders to the recipients in system 10) such as IBE public and private keys must be conveyed between parties securely (e.g., between a sender and a private key generator or between a recipient and a private key generator, etc.). A number of different approaches may be used to convey information over network 14 securely. For example, information may be conveyed securely over a secure communications path such as a communications path that uses the secure sockets layer protocol (SSL) or other suitable secure protocol (e.g., TLS), a communications path may be trusted because it is under the control of a trusted party (e.g., the communications path may be physically under the control of a trusted party), and information may be conveyed securely by encrypting the information (e.g., in a message) before sending it over an insecure (or secure) link.

The operation of system 10 may involve the use of traditional public-key encryption cryptographic techniques such as used with RSA public-key cryptography. For example, the secure sockets layer protocol, which may be used to secure communications between parties when a web browser or other application is used, involves the use of certificates from trusted certificate authorities. These traditional public key cryptographic techniques are referred to herein as "PKE" cryptographic techniques.

The operation of system 10 also uses identity-based encryption (IBE) cryptographic techniques. These cryptographic techniques are referred to herein as "IBE" cryptographic techniques.

PKE and IBE encryption schemes use an asymmetric approach. Some information (so-called public key information) is used to encrypt messages. Other corresponding information (so-called private key information) is used to decrypt the encrypted message.

To enhance the efficiency of the IBE decryption and encryption processes, "two-step" decryption techniques may be used in which a message key (e.g., a symmetric message key) is used to encrypt the contents of a message prior to transmission to the recipient. The IBE process may then be used to encrypt the symmetric message key. The message that is sent from the sender to the recipient contains the IBE-encrypted message key and the message-key-encrypted message contents. At the recipient, the recipient can use the IBE private key to decrypt the message key. The message key may then be used by the recipient to decrypt the rest of the message. These two-step processes may be more efficient than "pure" or "single step" IBE encryption algorithms in which the IBE algorithm alone is used to encrypt the entire message. Both types of approaches (and the multi-layer IBE encryption approaches that are described further below) are often generally referred to herein as simply "IBE" schemes for clarity.

IBE encryption schemes can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001. See also http://eprint.iacr.org/2001/090 by Dan Boneh and Matthew Franklin). With the approach described in the work of Boneh and Franklin, IBE encryption is based on the properties of bilinear maps such as a Weil Pairing or Tate Paring. For clarity, aspects of the present invention will sometimes be described in the context of an identity-based encryption scheme such as the elliptic curve implementation described by Boneh and Franklin. This is, however, merely illustrative. Any suitable approach for IBE encryption may be used with system 10 if desired.

Initially, when the system is set up, an IBE private key generator (e.g., IBE private key generator 16 of FIG. 1) obtains or generates a master secret s. For example, the private key generator may create a master secret from a number that is randomly generated at the private key generator by a processor housed inside a tamper-proof enclosure. The master secret may also be produced off-site and delivered to the private key generator 16. The master secret (also sometimes referred to as a secret master key or a master key) is secret information that will subsequently be used by the private key generator 16 to generate private keys for recipients in the system to use in decrypting messages and to generate public parameter information for use by senders in encrypting messages.

After the master secret s has been obtained, the private key generator may generate the public parameter information. In the identity-based encryption approach of the above-mentioned work of Boneh et al., the public parameter information that is generated includes public parameters P and sP. The parameter P may first be generated by the IBE private key generator (e.g., using a random number generator). The parameter sP may then be generated by the IBE private key generator. The "multiplication" of s by P in the Boneh and Franklin work is accomplished using the multiplication of integers with points on elliptic curves. While multiplication (calculating sP) is straightforward, the inverse operation (determining s from knowledge of P and sP) is so computationally expensive that it is impractical for an attacker to obtain s in this way.

The public parameter information (e.g., the parameters P and sP in an identity-based encryption process based on elliptic curves) may be numbers. In general, there is an equivalency between numbers, letters, symbols, and other such schemes for representing information. Sometimes certain information (e.g., the master secret or public parameters) will be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

After the public parameter information (e.g., P and sP) has been determined, the IBE private key generator 16 may make this information available to senders in system 10. The public parameter information may be provided to the senders using any suitable technique. For example, recipients may send the public parameter information to senders in email messages. If desired, the private key generator 16 may publish the public parameter information using a directory service or by placing the public parameter information on a particular host server that a sender can reach using an associated domain name or other suitable service name based on the recipient's public key. These are merely illustrative techniques for making the public parameter information available to users in system 10. Any suitable technique for making the public parameter information available to the users may be used if desired.

If the public parameter information includes more than one parameter, the parameters may be provided to the users together or separately. For example, parameters P and sP may be provided to a user together in a single transmission or separately in two transmissions. If parameters P and sP are provided separately, each parameter may be distributed using a different distribution mechanism. For example, P may be provided to a user over a secure sockets layer path and sP may be conveyed to the user in an encrypted email message. As another example, all users may know P in advance and sP may be distributed electronically. If desired, P may be the same for all or substantially all users in the system. Moreover, P and sP may be combined to form the equivalent of a single number or parameter or may be subdivided (e.g., to form three or more public parameter sub-parts). If desired, some of the public parameter information may be distributed manually (e.g., by printed mail or by distributing a diskette or other computer-readable media to the user).

Once the public parameter information (e.g., public parameters P and sP) has been provided to a user (i.e., a sender) who desires to send an encrypted message to another user (i.e., a recipient), the sender may encrypt and send the message to the recipient. An IBE encryption engine 18 implemented on the sender's equipment may be used to encrypt the message. The IBE encryption engine 18 may use the public parameter information (e.g., P and sP) and the IBE public key associated with the recipient to perform message encryption. When the recipient receives the IBE-encrypted message, or earlier, when the recipient sets up or updates the equipment at the recipient's location, the recipient obtains the recipient's IBE private key from the IBE private key generator 16 to use in decrypting the message. The recipient may use an IBE decryption engine 20 implemented on the recipient's equipment to decrypt the message. The IBE encryption engine 18 and decryption engine 20 may use software to implement the desired IBE encryption and decryption algorithms. Engines 18 and 20 may be provided to users in the system as part of the users' initially-loaded messaging software, as a downloadable program or plug-in, or using any other suitable technique.

Identity-based encryption (IBE) is so named because the encryption process at the sender uses an IBE public key Q that is generally based on the recipient's identity. The identity of a user in an IBE encryption scheme may be represented by any suitable string, number, or symbol. For example, the identity of a message recipient may be represented by that recipient's email address, name, or social security number. An advantage of IBE schemes is that a sender can generally determine the identity (e.g., the email address) of an intended recipient without all of the complexities involved in obtaining the PKE-public key of the intended recipient as would be required with traditional PKE schemes such as the RSA cryptographic scheme. For example, the IBE public keys may be the same as (or based on) user email addresses, which are readily obtainable.

The IBE private key generator 16 may generate IBE private keys for each of the multiple users associated with that IBE private key generator based on the IBE public keys (the Q's) of each of these users (e.g., based on the users' identities).

The form of IBE public key Q that is used for a given IBE scheme depends on the security features that are desired. For example, user privileges may be made to automatically expire by automatically concatenating a validity period (e.g., a date or date range such as the current day of the year and year, the current month, starting and ending dates such as Jan. 2, 2003-Jan. 10, 2003, or any other suitable time-related date-stamp information) with each user's email address to form Q values based not only on the users' identities (i.e., email addresses) but also validity period information. The validity period acts as an access policy for the encrypted message that is more generally applicable than the user-specific email address identity information.

According to the validity period, it is not permissible to access the contents of the encrypted message if the current date does not fall within the validity period. The policy may be enforced by the private key generator 16. If the current date is not within the validity period specified in the public key, the private key generator 16 will refuse to generate and provide an otherwise authorized message recipient with a copy of the corresponding private key that is needed to decrypt the message. With this approach, private keys do not have unlimited lifetimes, which enhances the security of the system.

As another example, users' privileges may be restricted based on security clearance level. With this approach, security clearance level information may be concatenated or otherwise added to each user's email address when forming the public keys Q (i.e., Q=joe@navy.com | top_secret, etc.). These approaches are merely illustrative of the ways in which policy-based criteria may be added to a user identity such as a user email address when forming the IBE public key for each user (e.g., the Q for each user). Any suitable approach for forming IBE public keys based on user identity information and additional criteria may be used if desired.

If desired, the IBE public keys used in system 10 may be based solely on non-user-specific access policy information and not on a specific individual's identity. As an example, an IBE public key may be based solely on an availability date (e.g., Mar. 20, 2003). The contents of a message encrypted using this IBE public key may not be accessed by any user until after Mar. 20, 2003.

With IBE encryption schemes whose IBE public keys represent access policies that are not specific to a single individual, IBE-encrypted messages may be distributed to numerous individuals in parallel (i.e., the "recipient" may be considered to be many individuals). Only those individuals who are authorized (i.e., those who have or can obtain the appropriate IBE-private key by satisfying the IBE public key access policy constraints) may decrypt the message and access its content.

A sender may also send an IBE-encrypted message to multiple recipients. For example, a sender may send a message to a list of distinct email addresses, each associated with a different recipient each of which has a different IBE private key. In this type of scenario, the sender encrypts the message sent to each recipient differently (i.e., using the appropriate IBE public key for each intended recipient).

When a sender uses a policy-based IBE public key Q to encrypt a message, the same version of the encrypted message may be sent to multiple parties in parallel. In this case, the recipient in the system 10 may be made up of multiple individuals or organizations. Anyone who can decrypt the message properly can view the message contents. Examples of multiple-party recipients to whom a sender may send an IBE-encrypted message include all members of a particular organization, all individuals or organizations with a particular security clearance, all supply chain management systems associated with the supplier's of a particular company, all subscribers to a particular service, etc.

A sender desiring to send an IBE-encrypted message should have information sufficient to construct the IBE public key Q of the intended message recipient. This information may include information on an individual recipient's identity (e.g., an email address), information on how to construct the IBE public key Q from suitable access policy information (e.g., validity period, security level, subscription level, content rating, geographic region, etc.), or any other suitable identity information and/or generally-applicable access policy information that specifies which parties are allowed to access the contents of the message and under what conditions such access is permitted.

The sender must also obtain the public parameter information (e.g., P and sP) associated with the intended recipient of the message prior to message transmission.

Once the sender has the IBE public key of the recipient and the appropriate corresponding public parameter information, the sender may use the IBE encryption process (e.g., the process of the work of Boneh and Franklin described above) to encrypt the message contents for the recipient. The IBE process may be implemented using software at the sender's equipment such as IBE encryption engine 18. The encryption engine 18 may be a stand-alone process or application or may be incorporated into another process or application. The IBE encryption engine 18 may take as inputs (1) the message to be encrypted, (2) the IBE public parameter information (e.g., P and sP), and (3) the IBE public key Q. The IBE process implemented using the IBE encryption engine 18 produces an encrypted version of the message as its output.

The sender may transmit the encrypted message to the recipient using an email program or other suitable software. After the sender transmits the IBE-encrypted message to the recipient over communications network 14, the recipient may receive the message. The recipient may decrypt the received message using an appropriate IBE private key. The recipient may use decryption engine 20 to decrypt the message. The IBE private key that is used for decrypting the message is related to the IBE public key Q and public parameter information (e.g., P and sP) used when encrypting the message. Only the IBE private key that matches the IBE public key that was used to encrypt the message may be used to decrypt the message. Generation of the IBE private key requires knowledge of the master secret s, so only the private key generator 16 can generate the recipient's IBE private key based on the recipient's IBE public key Q.

With one suitable approach, the IBE private key for the recipient may be generated from the recipient's IBE public key Q and the master secret s by using an appropriate mathematical function (e.g., the multiplication of integers with points on elliptic curves) to calculate the value of sQ.

The recipient's authorization to receive the message may be verified using authentication information (credentials) from the recipient and using other information (e.g., independently-gathered information on the current date). The private key generator 16 may use the access policy embodied in the IBE public key to determine whether a given recipient is authorized. Once the IBE private key generator 16 verifies that the recipient is authorized to access the message contents, the private key may be issued to the recipient by the IBE private key generator 16.

If desired, the IBE private key generator 16 and the recipient may use intermediate parties as agents during the process of providing recipient credentials, verifying the recipient's authorization to access the message content, and providing the IBE private key. For clarity, the present invention is primarily described without the presence of such intermediate agents. Any suitable manual or automatic authentication technique may be used by the IBE private key generator 16 to verify that the recipient (or the recipient's agent) is authorized to receive the IBE private key prior to issuing the key to the recipient.

Regardless of how the IBE private key generator 16 determines that the recipient is authorized to obtain the IBE private key, the private key should be provided to the recipient for use in decrypting the message. Any suitable technique may be used to provide the IBE private key to the recipient. For example, the private key may be transmitted to the recipient in an email or other suitable message or may be made available for downloading over the Internet (as part of a stand-alone downloadable application or a downloadable plug-in module, as a stand-alone key, etc.). A secure communications channel may be used for electronic communications between the IBE private key generator 16 and the recipient's equipment 12. If desired, the IBE private key may be preinstalled on the recipient's equipment, so that the private key will be available for the recipient when the recipient first uses the equipment. The private key may also be distributed by mail or courier (e.g., on a computer-readable medium such as a computer disk or memory chip).

The recipient may, if desired, store the private key locally (e.g., in a database on a storage device such as a memory circuit or hard drive on the recipient's equipment). If the private key is stored locally (and has not expired or otherwise become obsolete), the recipient can retrieve it the next time a message needs to be decrypted without needing to contact the IBE private key generator 16 to obtain a new copy of the IBE private key over the communications network.

The sender may cache public parameter information on the sender's equipment in a similar fashion to facilitate retrieval of the public parameter information when it is desired to send an encrypted message.

Figure 2:
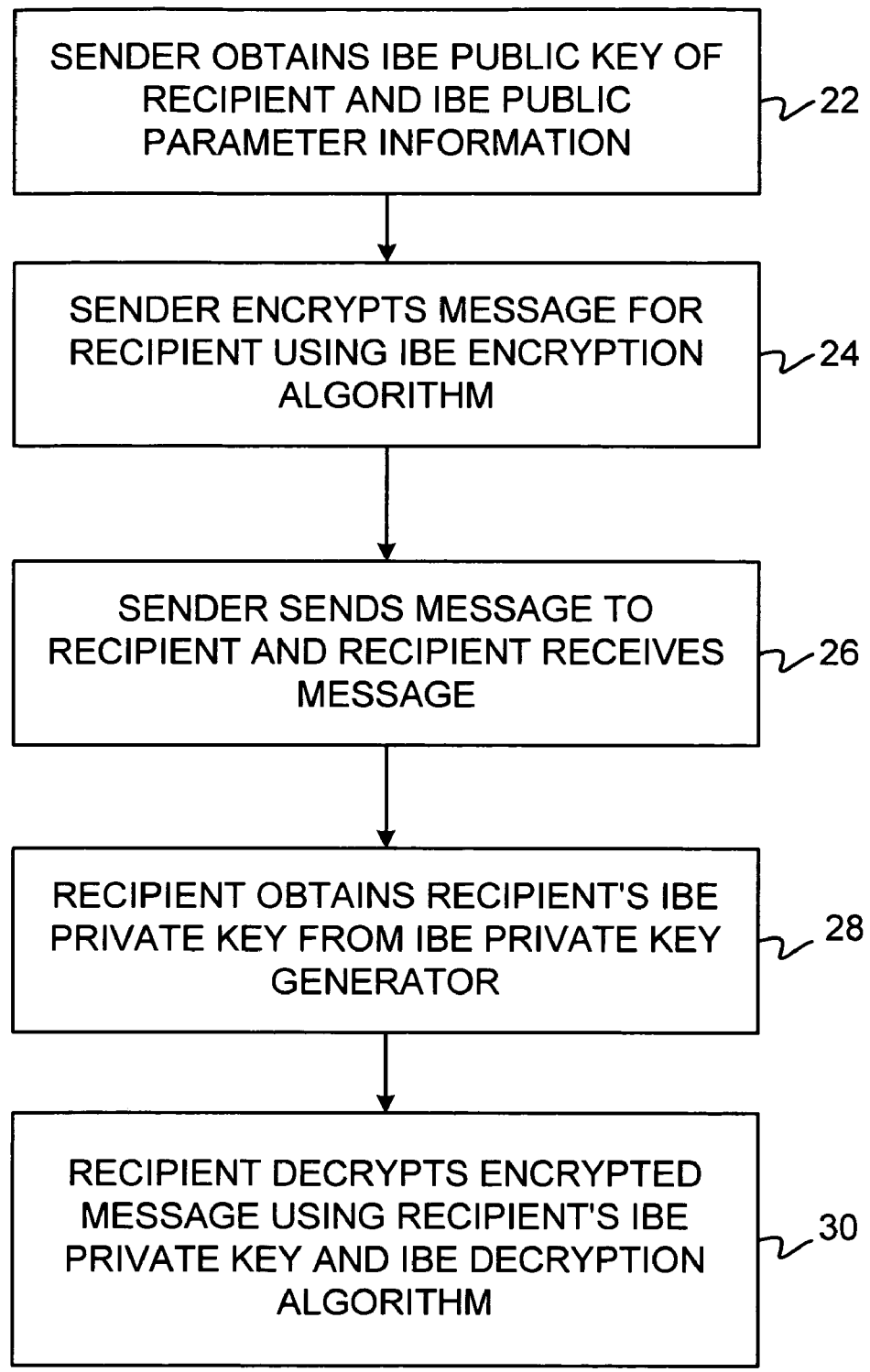
FIG. 2 is a flow chart of illustrative steps involved in using identity-based-encryption techniques to support secure messaging in accordance with the present invention.

Illustrative steps involved in using IBE-encryption to convey a secure message from a sender to a recipient in system 10 are shown in FIG. 2. At step 22, the sender may obtain the IBE public key Q of the intended recipient and the associated IBE public parameter information (e.g., parameters P and sP). The IBE public key Q may be obtained from a source that has a copy of the appropriate IBE public key Q or may be generated based on known rules (e.g., by obtaining the recipient's email address or other identity information, by determining a suitable validity period or other generally-applicable access policy information, and by using this information to generate Q). The IBE public parameter information may be obtained from the recipient or other suitable party, may be obtained over network 14 from a directory service (e.g., a directory service implemented on a server connected to network 14), or may be obtained over network 14 from a host associated with the IBE private key generator 16 that generated the public parameter information. The IBE public key Q and IBE public parameter information may be cached locally by the sender for later retrieval if desired.

At step 24, the sender may use IBE encryption engine 18 (FIG. 1) to encrypt a message for the recipient.

The IBE-encrypted message may be sent to the recipient over network 14 and received by the recipient at step 26. The message may be accompanied by information on the IBE public key Q that was used to encrypt the message. This information may be used by the recipient in determining which private key generator 16 to contact at step 28 to obtain the IBE private key needed to decrypt the message.

To obtain the IBE private key from the private key generator, the recipient may provide information on Q (e.g., Q, a precursor of Q, or a derivative of Q) to the private key generator that the private key generator can use to determine which private key is being requested (and which access policies apply). The recipient can provide the private key generator with recipient credentials such as username and password information, biometric information, age information, and other suitable identity and authentication information that the private key generator 16 may use to verify that the recipient is authorized to obtain the requested IBE private key.

If desired, certain access policies may be implicit. Moreover, the private key generator may use its own information (e.g., information on the current time and date) as well as recipient-provided information in determining whether or not a given recipient is authorized to obtain the IBE private key. During the authentication process, the recipient and the IBE private key generator may communicate using secure communications (e.g., using PKE-encrypted messages, a trusted communications path, a secure communications link such as an SSL or TLS link, etc.).

When the private key generator 16 determines that the recipient is authorized to obtain a copy of the IBE private key, the private key may be provided to the recipient securely at step 28 (e.g., in a secure message or over a secure communications link in network 14).

At step 30, after the recipient has obtained the appropriate IBE private key, the recipient may use this private key with decryption engine 20 (FIG. 1) to decrypt the encrypted message.

There are typically many private key generators 16 in system 10, so it is helpful when the sender sends the IBE public key Q to the recipient with the message. The recipient may use the information on the IBE public key Q that is provided with the message in requesting the appropriate IBE private key from the IBE private key generator. For example, the recipient may determine from Q that the needed IBE private key may be obtained from an IBE private key generator 16 that is associated with a movie subscription service or the recipient may determine from Q that the needed IBE private key is to be obtained from a private key generator 16 that is associated with the recipient's employer. The recipient may pass Q to the private key generator when requesting the corresponding private key.

Message data to be encrypted (e.g., the video, audio, text, graphics, code, or other content of a message) may be represented by the symbol M. Encryption by a key K (e.g., a message key such as a symmetric message key S or an IBE public key Q) may be represented using a subscript notation, as shown in expression 1.

$$M_K \qquad (1)$$

If K is an IBE public key, it may be desirable to encrypt M using a symmetric key S, because symmetric key encryption is generally more efficient than IBE encryption. Encryption of M using a symmetric key S is shown in expression 2.

$$M_S \qquad (2)$$

It is not possible to send both the symmetric-key-encrypted message $M_S$ and the symmetric key S that the recipient needs to access the contents M to the recipient over network 14 unless the symmetric key is transmitted securely, because anyone obtaining S can decrypt $M_S$. Accordingly, the symmetric key S may be encrypted using IBE public key Q. To allow the recipient to determine which IBE private key to request (and to determine which IBE private key generator 16 to request that private key from), the recipient may be provided with a copy of Q with the message. The copy of Q may be provided to the recipient in the same transmission as the message data or may be provided in a related transmission over network 14. The information that is sent from the sender to the recipient is shown in expression 3.

$$[M_S, S_Q, Q] \qquad (3)$$

With the approach of expression 3, the recipient is provided with message data M that has been encrypted using a message key S (preferably an efficient symmetric message key) to produce the encrypted message contents $M_S$. The recipient is also be provided with an IBE-encrypted version of the key S (i.e., $S_Q$). The IBE public key Q may be provided for the recipient to use in obtaining the appropriate IBE private key (sQ) to use in decrypting the message. When the recipient receives the information in expression 3, the recipient can use Q to obtain the appropriate sQ from the private key generator and then can use sQ to decrypt $S_Q$. The decrypted version of the symmetric key S may then be used to decrypt $M_S$ and obtain access to the message contents M. The approach shown in expression 3 may be referred to as a "two-step" IBE encryption process or just "IBE encryption". In general, a two-step approach of this type is preferred over a single-step or "pure" IBE approach of the type shown in expression 1, because symmetric key encryption is more computationally efficient than IBE encryption.

With the approach of expression 3, the IBE public key of the recipient is passed "in the clear" (unencrypted) to the recipient over network 14. As a result, all of the information in the IBE public key Q is exposed attackers on the network. While this may be acceptable in some circumstances, the IBE public key Q of a recipient may sometimes contain sensitive information. As an example, consider an IBE public key Q that is made up of two parts: less sensitive public key information QL and more sensitive public key information QG. For example, Q may be formed from the concatenation of QL and QG, as shown in expression 4.

$$Q = QL | QG \qquad (4)$$

Because any part of a public key Q may be used as a public key by itself, the public key sub-parts QL and QG are referred to hereinafter as public key QL and public key QG. The less sensitive key QL may contain (in this example) identity information such as the recipient's email address (e.g., joe@navy.com). The more sensitive key QG may contain (in this example) the recipient's security clearance level (e.g., top_secret). Although it may be acceptable from a security perspective to send information on the recipient's email address QL in the clear, it may not be acceptable from a security perspective to send information on the recipient's security clearance QG in the clear.

It may therefore be desirable to encrypt the message using a multi-layer IBE encryption arrangement, in which the more sensitive IBE public key information QG is nested within an inner layer and the less sensitive IBE public key information QL lies in an outer layer. With this approach, the more sensitive key part may be hidden from attackers during transmission to the recipient. There may be any suitable number of nested layers in a multi-layer IBE encryption arrangement. For example, there may be two layers, three layers, four layers, more than four layers, etc.

When a two-layer IBE encryption approach is used, the sender may send the message to the recipient in the form shown in expression 5.

$$[M_{QG}, QG]_{QL}, QL \qquad (5)$$

In expression 5, $M_{QG}$ represents the message data M that has been IBE-encrypted using the more-sensitive IBE public key QG. In order to provide the recipient with information on which IBE public key was used to encrypt message data M (in the inner layer), the value of QG may be passed to the recipient with the message, as shown in expression 5.

To ensure that QG is not transmitted to the recipient in the clear, a second or outer layer of IBE encryption may be used. With this approach, the less-sensitive IBE public key QL may be used to encrypt the more-sensitive IBE public key QG, thereby hiding the value of QG from public exposure during transmission of the message to the recipient. The value of QL may be passed to the recipient to assist the recipient in identifying which IBE public key (QL in this example) was used to encrypt the outer message layer.

If desired, it may be implicitly understood in system 10 that the outermost layer of IBE encryption always uses a particular type of public key information (e.g., the recipient email address). When the IBE public key information used on the outermost layer (or certain suitable inner layers) is known in advance (or can be determined easily by trial-and-error or other non-computationally-intensive techniques), it is not generally necessary to send that IBE public key information to the recipient with the message. Omitting this information may lessen the amount of information that needs to be transmitted between the sender.

Figure 3:
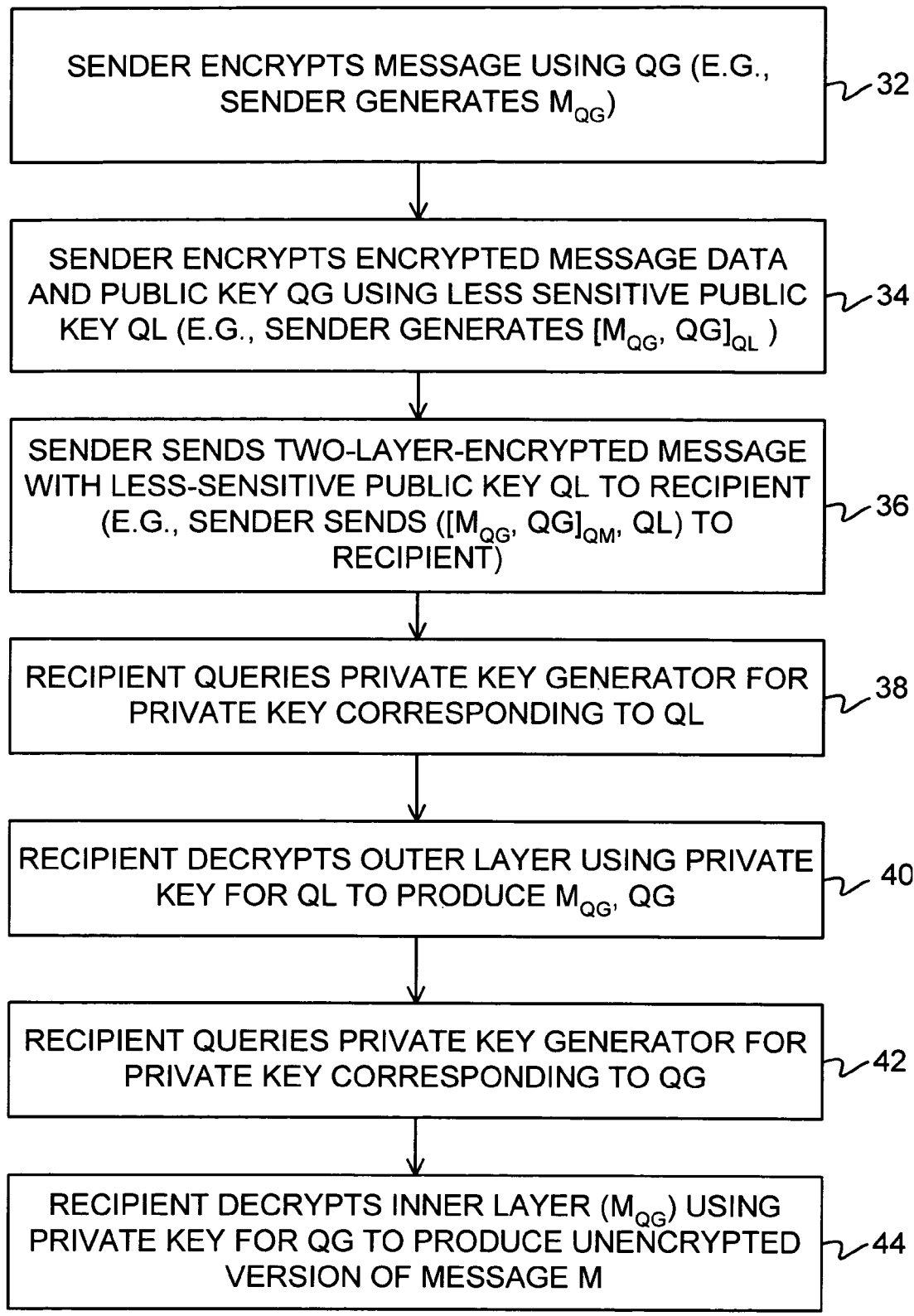
FIG. 3 is a flow chart of illustrative steps involved in using a two-layer identity-based-encryption technique to encrypt messages in accordance with the present invention.

Illustrative steps involved in using a two-layer IBE encryption approach to encrypt messages are shown in FIG. 3. At step 32, the sender may encrypt the message data M using encryption engine 18 and using the more-sensitive IBE public key QG.

At step 34, the sender may encrypt both the encrypted message data $M_{QG}$ and the more-sensitive IBE public key QG using the encryption engine 18 and using less-sensitive IBE public key QL to produce $[M_{QG}, QG]_{QL}$.

At step 36, the sender may send the resulting two-layer-encrypted message with its associated less-sensitive IBE public key QL to the recipient. In environments in which the recipient knows QL in advance (e.g., when QL is always the recipient's email address) or when the recipient can otherwise guess or determine QL in a manner that is not burdensome, the value of QL may be omitted.

At step 38, the recipient, having received the encrypted message and having determined which IBE public key was used to encrypt the outer message layer (i.e., QL in this example), may query the appropriate private key generator 16 for a copy of the IBE private key corresponding to QL. The query may be made (for example) over a secure communications path in network 14.

Before the private key is released to the requesting recipient, the private key generator 16 may verify that the recipient is authorized to receive the private key using the access policy specified by the public key. For example, if the IBE public key contains identity information, the private key generator 16 may verify that the recipient's identity matches identity information in the public key. As another example, if the public key contains an age-based access policy criteria, the private key generator may verify that the recipient's age is sufficient to access to the message. The private key generator may also verify that external information such as the current date and time is as specified in a date-based or time-based access policy portion of the public key.

After the recipient's authorization to obtain the private key for decrypting the message has been verified, the private key generator 16 may, in response to the query for the private key from the recipient, provide the IBE private key needed to decrypt the QL-encrypted information to the recipient over network 14 (e.g., in a secure message or over a secure link such as a SSL or TLS link).

At step 40, the recipient may use decryption engine 20 and the private key that has been received from the private key generator 16 to decrypt the outer (QL-encrypted) layer of the message, thereby producing $M_{QG}$ and QG.

At step 42, the recipient uses the value of QG that has been produced to query the private key generator 16 for the corresponding IBE private key. After the recipient's authorization to obtain the IBE private key corresponding to QG has been verified by the private key generator, the private key generator may provide the appropriate private key to the recipient.

At step 44, the recipient may use the IBE private key corresponding to QG and decryption engine 20 to decrypt the inner message layer $M_{QG}$, thereby producing an unencrypted version of the message contents M.

Any suitable number of IBE message layers may be encrypted using this approach. For example, three layers, four layers, or more than four layers may be encrypted. Moreover, symmetric keys or other suitable message keys may be used with the IBE keys to improve the efficiency of the encryption process.

Figure 4:
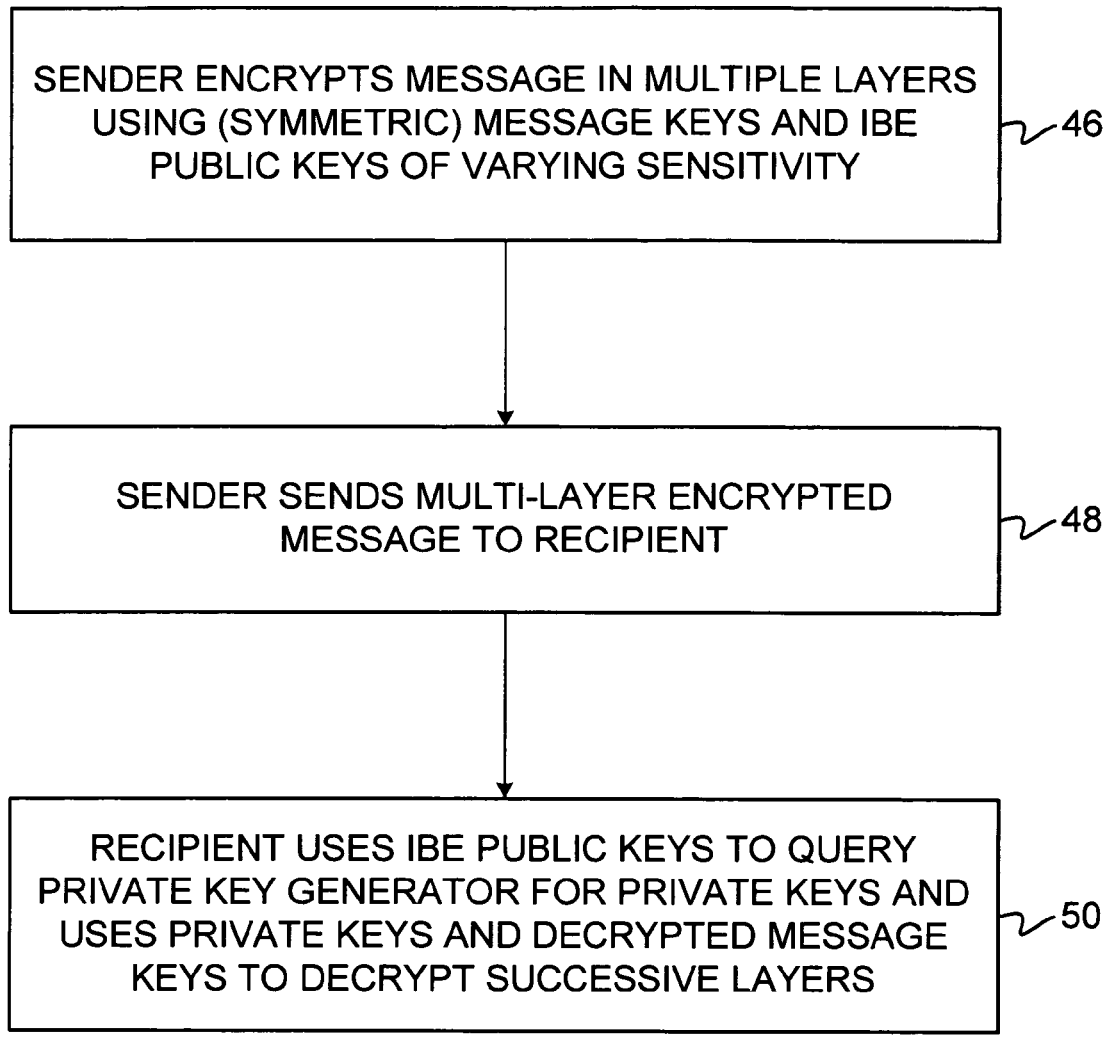
FIG. 4 is a flow chart of illustrative steps involved in using a multiple-layer identity-based-encryption technique to encrypt messages in accordance with the present invention.

Illustrative steps involved in using a layered IBE encryption approach to encrypt a message in multiple layers (e.g., two, three, or more layers) using IBE public keys with varying sensitivity levels are shown in FIG. 4.

At step 46, a sender may encrypt a message in multiple layers using message keys (e.g., symmetric message keys) and IBE public keys of varying sensitivity. The less sensitive keys may be used to encrypt the outer layers of the message and the more sensitive keys may be used to encrypt the inner layers of the message. For example, a message may be encrypted in four layers using IBE public keys Q1, Q2, Q3, and Q4. If Q1 is the most sensitive key (e.g., the identity information and/or other access policy information in Q1 is the most sensitive), and if Q2, Q3, and Q4, are increasingly less sensitive, then Q1 may be used for the innermost layer of encryption, Q2 may be used for the second most inner layer of encryption, Q3 may be used to third most inner layer of encryption, and Q4 may be used for the outermost layer of encryption. The public keys may be embedded in the message in their respective layers so that they are available to the recipient at the appropriate stages of the decryption process.

At step 48, the sender may send the multiple-layer IBE-encrypted message to the recipient over network 14. For example, with a four-layer approach, the sender may send the message to the recipient in the form shown in expression 6.

$$[[[M_{Q1}, Q1]_{Q2}, Q2]_{Q3}, Q3]_{Q4}, Q4 \tag{6}$$

At step 50, the recipient may use the IBE public keys (e.g., public keys such as Q1, Q2, Q3, and Q4) to obtain the respective IBE private keys from the appropriate private key generator(s) 16. The private key generator may use the access policies specified in the public keys to verify that the recipient is authorized to access the message before the corresponding private keys are released to the recipient. Each private key may be used to decrypt the next layer of the message that is revealed, until the entire message has been decrypted from the outermost layer inward.

By embedding public keys Q1, Q2, and Q3 in the inner layers of the encrypted message, these public keys are not sent in the clear at step 48. Moreover, because the most sensitive public keys (e.g., public key Q1) is buried within multiple layers of encryption, it is the most well-protected public key of all. Only a recipient who is able to decrypt the outer layers of the message associated with keys Q2, Q3, and Q4 (in the four-layer example) will be able to view public key Q1.

During step 50, any symmetric keys that were used for encryption and that were provided with the message will be revealed as the layers are decrypted and can therefore be used to decrypt the appropriate portion of the message.

The type of layered IBE encryption scheme that is used for a given application depends on a number of different constraints such as the desired level of encryption complexity (or lack of complexity), the desired efficiency of the process, the particular public key information that it is desired to hide from view, the level of security required, etc. Although certain schemes may produce mathematically equivalent results, practical considerations may favor the use of one approach over another depending on circumstances.

For example, it may be possible to improve the efficiency of the two-layer IBE encryption process described in connection with expression 5 by performing the outer layer of IBE encryption (e.g., encryption using the less-sensitive IBE public key QL) on only the nested more-sensitive IBE public key QG, rather than on both the already-encrypted message $M_{QG}$ and QG. $M_{QG}$ need not be encrypted using QL as shown in expression 5, because $M_{QG}$ is already encrypted. It is therefore sufficient to encrypt QG with QL. With this modified two-layer IBE message encryption approach, the encrypted message may be sent from the sender to the recipient in the form shown in expression 7.

$$M_{QG}, QG_{QL}, QL \quad (7)$$

This technique may also be used when encrypting three-layer messages, four-layer messages, or messages encrypted using even more layers.

Another possible way to improve the efficiency of a multi-layer IBE cryptographic process is to use one or more symmetric keys to encrypt parts of the message. As an example, the two-layer IBE encryption process described in connection with expression 5 may use a nested symmetric key S, as described in connection with expression 3. Using a hybrid two-layer IBE/symmetric-key approach of this type, the resulting encrypted message that is provided to the recipient may be as shown in expression 8.

$$M_S, S_{QG}, QG_{QL}, QL \quad (8)$$

As another alternative, the symmetric key and more-sensitive IBE public key QG may be used in an inner message layer that is encrypted using a less-sensitive public key QL, to produce the version of the encrypted message shown in expression 9.

$$[MS, S_{QG}, QG]_{QL}, QL \quad (9)$$

In general, however, it is not necessary to encrypt the message data M more than once, and running the message payload through an encryption process twice in this way can be inefficient. Cryptographic approaches in which M is encrypted more than once are therefore not generally preferred and are not discussed in detail herein.

Similarly, although the approach of expression 8 could be implemented using the approach of expression 10 (in which symmetric key S is encrypted twice), approaches of this type are not generally preferred over approaches of the type shown in expression 8 (in which the symmetric key is only encrypted once).

$$M_S, [S_{QG}, QG]_{QL}, QL \quad (10)$$

Because it is generally not preferred to needlessly perform double encryption on message components, such approaches, while feasible possibilities for implementing multi-layer IBE message encryption in system 10 are not discussed in detail herein.

Moreover, although a single-symmetric key is generally satisfactory, two or more symmetric keys may be used when encrypting multi-layer IBE messages if desired. As an example, a two-IBE-layer message may be encrypted using the format shown in expression 11, where S and S' are two different symmetric message keys.

$$M_S, S_{QG}, QG_{S'}, S'_{QL}, QL \quad (11)$$

Use of the second symmetric key S' in this arrangement (and correspondingly more symmetric keys in multiple-layer schemes involving three or more layers) provides for enhanced efficiency when encrypting QG.

If QG is not too large, it may be acceptable to use the approach of expression 8 as an alternative. With the approach of expression 8, the second symmetric key S' is omitted. This makes the encryption process less complex, but may slightly decrease encryption efficiency, because encryption of QG with IBE (i.e., using public key QL) is generally less efficient than encryption of QG with symmetric key S', even including the overhead associated with encrypting S' with IBE (i.e., using public key QL).

Regardless of whether message components are encrypted more than once during the process of encrypting the message (e.g., whether the message data M is only encrypted once using S and then S is encrypted using IBE or whether both $M_S$ and S are encrypted using IBE so that M is encrypted twice—once by S and once by IBE) and regardless of whether one or more symmetric keys are used during the encryption process, the use of multiple IBE public keys to encrypt the message in multiple corresponding layers is still referred to herein as a "multi-layer" IBE cryptographic process.

In general, it is preferable to conceal IBE public key information that is relatively more sensitive in the inner layers of the IBE-encrypted message. However, sometimes information that is not sensitive may be included in otherwise sensitive IBE public keys. Such IBE public keys may still be used to encrypt an inner layer of the message rather than an outer layer. As a result, some of the information in a public key such as a more-sensitive public key QG may, in fact, be less sensitive than some of the information in a less sensitive public key QL (and a similar relationship may hold for corresponding portions of Q1, Q2, Q3, and Q4 in the four-layer example).

In some of the examples above, M was encrypted using two distinct public keys QG and QL (e.g., a more-sensitive IBE public key QG such as a security clearance and a less-sensitive IBE public key QL such as the recipient's email address). In general, the IBE keys that are used for the outermost and innermost layers of IBE encryption (and any intervening intermediate layers when encryption uses three or more IBE encryption layers) may or may not be distinct. In some scenarios, for example, part of the IBE public key QG may overlap with part of the IBE public key QL. In a four-layer example having keys Q1, Q2, Q3, and Q4, part of Q1 (the IBE pubic key used to encrypt the innermost layer of the message) may overlap with all or part of the third-layer IBE public key Q3 (as an example).

As a specific example of overlapping IBE public keys, consider a scenario in which it is desired to encrypt a message for a recipient who is a senior officer in a military organization. The recipient may have top secret clearance and may be a member of a highly classified project ("project X").

The recipient may have an administrative assistant who is not a senior officer, but who is generally able to access the recipient's email messages. This type of sharing of email addresses between members of an organization who work closely together is not uncommon and unless some sort of sharing of this type is allowed between the recipient and the assistant, communication with the recipient may become difficult. Although the assistant works closely with the recipient and also has top secret clearance (in this example), it is desired to keep the fact that the recipient is a member of project X a secret, even from the assistant.

One way in which to encrypt the message for the recipient while maintaining a satisfactory level of access for the assistant is to encrypt message data M using public keys with overlapping attributes. For example, the message may be encrypted using four IBE encryption layers. Each layer may have a corresponding IBE public key. The outermost layer's public key may be Q4, the second-to-outermost layer's public key may be Q3, the second-to-innermost layer's public key may be Q2, and the innermost layer's public key may be Q1.

Access policy attributes that may be used as public key components during encryption may be denoted as QA, QB, QC, QD, and QE. In this example, QA may be validity period (date stamp), QB may be the recipient's email address, QC may be the recipient's security level (top secret in this example), QD may be the recipient's rank (senior officer), and QE may be a project code (the code "project X" in this example). The message data may be encrypted using the format shown in expression 12 or one of the mathematically equivalent but more efficient multi-layer IBE encryption alternatives described above may be used that employs symmetric keys and avoids the double-encryption of message components. The format of expression 12 is used as an example, because it shows the IBE encryption layers clearly.

$$[[[M_{Q1}, Q1]_{Q2}, Q2]_{Q3}, Q3]_{Q4}, Q4 \quad (12)$$

The public keys used in expression 12 may be constructed as shown in expressions 13, 14, 15, and 16.

$$Q4=QA|QB \quad (13)$$

$$Q3=QA|QB|QC \quad (14)$$

$$Q2=QA|QB|QC|QD \quad (15)$$

$$Q1=QA|QB|QC|QD|QE \quad (16)$$

In this example, the public keys Q1-Q4 were formed using the concatenation process (denoted by the symbol |). The process of concatenation is, however, merely one illustrative way in which to combine access-policy-based IBE public key components to produce more complex IBE public keys. Any suitable method for forming the IBE public keys used for the different layers of encryption may be used if desired.

With the arrangement of expressions 12-16, the encrypted message that is sent to the recipient includes both the encrypted inner portion of the message (i.e., $[[[M_{Q1}, Q1]_{Q2}, Q2]_{Q3}, Q3]_{Q4}$ and the IBE public key Q4. Because Q4 includes only the email address and validity period information QA and QB, the value of Q4 is not particularly sensitive, and can be transmitted in the clear without concern.

The message portion that is encrypted in the layer using Q4 (i.e., $[[M_{Q1}, Q1]_{Q2}, Q2]_{Q3}$, Q3), may be accessed by both the recipient and the recipient's administrative assistant, because both of these parties receive email messages addressed to the recipient's email address (assuming the message has not expired, so that the validity period criteria QB is satisfied). Either the intended recipient or the assistant can also obtain the private key corresponding to Q3 from the private key generator, because both have top secret clearance (attribute QC). By placing the clearance level associated with the message within an inner layer (i.e., by encrypting Q3 with key Q4), it is not necessary to pass potentially sensitive information about the recipient's clearance level in the clear during message transmission.

The recipient (or the administrative assistant) can use the private key corresponding to Q3 to decrypt the next most inner layer to reveal $[M_{Q1}, Q1]Q2$ and Q2. Although the administrative assistant has top secret clearance (so it is presumably acceptable for the assistant to view information on the "senior officer" rank of the recipient that is contained in Q2), the administrative assistant will not be able to unlock the innermost two layers of the message to reveal $M_{Q1}$ and Q1 and to eventually reveal M itself, because (in this example), the administrative assistant will be unable to prove to the private key generator that the administrative assistant has the rank of "senior officer," which is required before the private key generator will provide a requester with the private key corresponding to public key Q2.

As a result, the administrative assistant will be able to ascertain that there is an encrypted message waiting for the recipient in the recipient's email inbox, and will be able to view the unencrypted version of Q2, but will not be able to view Q1 or the message data M. The administrative assistant is therefore not able to determine whether or not the recipient is a member of project X.

When the recipient proves to the private key generator that the recipient has a rank of "senior officer," the private key generator may provide the recipient with the IBE private key corresponding to Q2. The recipient may then use this private key to decrypt the second most inner layer to produce $M_{Q1}$ and Q1. The recipient can use Q1 to request the private key corresponding to public key Q1 from the private key generator. With this private key, the recipient can decrypt $M_{Q1}$ to access the unencrypted version of the message contents M.

By using successive layers of IBE encryption with layers that progress inwardly using more specific and sensitive IBE public keys, potentially sensitive information in the IBE public keys may be hidden from unauthorized viewing. The public keys that are used to encrypt each layer may be distinct from each other (e.g., one may be an email address and another may be a security clearance level concatenated with a user name) or the public keys may overlap (e.g., as shown in expressions 14-17). Using overlapping public keys in which the public key information used for an inner layer contains attributes of an outer layer can reduce complexity, because fewer different attributes need to be handled by the system. In nested overlapping arrangements such as the illustrative arrangement described in connection with expressions 13-16, each layer's IBE public key components are, progressing inwardly, a subset of the previous layer's components.

Another example in which it may be desired to use a multi-layer IBE encryption approach involves content distribution schemes (e.g., for distributing messages made up of movies or songs). With these types of services, it may be desirable to encrypt the message (i.e., the movie or song message) before the content is distributed. As with the email message example given above, it is generally desirable to use the public key information itself to specify access policies for the encrypted content, rather than forcing third party services or the private key generator to independently determine which access policies to use. Policy attributes (e.g., validity period, recipient identity, subscriber status, membership level, geographic region, age, etc.) may be used to form one or more IBE public keys for use in encrypted content distribution.

Encrypted messages may be distributed with information on the public key that was used to encrypt the message. The recipient may use this public key information (or, in some cases may implicitly know this information already) and may use it to query the private key generator 16 for the corresponding IBE private key needed to decrypt the message. If the private key generator 16 determines that the recipient is authorized to access the message content (e.g., if the private key generator determines that the recipient is authorized from recipient credential information provided by the recipient and information gathered externally such as information on the current time and date), the private key generator 16 may provide the recipient with a copy of the corresponding IBE private key. The message recipient may use the IBE private key to unlock the video or song in the encrypted message.

Sometimes the content being distributed may be encrypted using public key information that is sensitive. For example, a movie may be encrypted with an "over 17 only" rating. The recipient of the movie may not want others to know that the recipient is receiving "over 17 only" movies. Accordingly, a two-layer (or more) IBE encryption scheme may be used.

As an example, an outer layer of encryption may be based on an IBE public key QL that is based on the recipient's subscriber number, whereas an inner layer of encryption may be based on an IBE public key QG that is based on the recipient's subscriber number concatenated with the rating of the movie. The movie may be encrypted to produce an encrypted message format of the type shown in expression 17, where M is the movie data, QG is the ratings-based more-sensitive IBE inner-layer public key, QL is the subscriber-number-based less-sensitive IBE outer-layer public key, and S is a symmetric key used to enhance encryption efficiency.

$$M_S, S_{QG}, QG_{QL}, QL \tag{17}$$

With this approach, the movie content M is fully encrypted and can only be accessed by a recipient who can prove to the IBE private key generator that the recipient has the subscriber number specified in QL and has an age sufficient to receive a movie with the rating specified in QG. Because the subscriber number QL is used to encrypt the rating QG, the ratings information QG need never be transmitted in the clear and is therefore kept confidential, ensuring the privacy of the subscriber.

During the decryption process, the subscriber/recipient may first query the private key generator for the private key corresponding to QL. After this private key has been obtained and used by the subscriber/recipient to decrypt the outer layer of the message, the subscriber recipient may use the resulting decrypted value of QG to query the private key generator for the private key needed to decrypt the inner layer of the message. This inner-layer private key may be used with decryption engine 20 of FIG. 1 to decrypt S, which is then used to decrypt M.

In content distribution schemes, a service provider that is connected to network 14 serves as the message sender. Content such as movies and songs may be sent to subscribers (who are recipients) in the form of IBE-encrypted messages. Any suitable message format may be used for distributing encrypted message content from a service provider to subscribers in system 10 or for distributing other suitable encrypted data from senders to recipients.

In one suitable arrangement, the data to be distributed may have a number of associated data attributes. For example, if the data to be distributed is a movie, the movie and data structure may have associated attributes such as the subscriber number of the subscriber who ordered the movie, the rating of the movie, the title of the movie, the region in which the movie is authorized for distribution, a validity period, the data type (e.g., "movie"), etc. The data to be distributed (e.g., the movie data) and the associated data attributes may be embedded in a data structure 52 (e.g., an XML data structure of the type "movie"), as shown in FIG. 5.

The IBE public keys for different layers of IBE message encryption in a multi-layer IBE encryption scheme may be formed using the data attributes in the data structure. The way in which the various attributes are used to form access policies for the IBE public keys may be specified using information in a IBE policy attribute record such as the illustrative XML IBE policy attribute record 54 of FIG. 6. The IBE policy attribute record 54 includes information on which type of data structure ("movie") the record pertains to. The record 54 also has a number of entries that specify for each of certain data attributes what the corresponding access policy rule is to be.

As an example, for the movie attribute of "subscriber number," the record 54 specifies that the corresponding IBE-public-key access-policy is "viewer subscriber number must match." When the private key generator 16 applies this policy, the private key used to decrypt the encrypted movie message will only be released to the subscriber whose subscriber number matches the subscriber number attribute in the movie data structure 52 (FIG. 5). As another example, in the IBE policy attribute record 54, the movie attribute "rating" may have a corresponding IBE-public-key access-policy of "must be old enough to view rating." When the private key generator 16 applies this policy, the private key will only be released if the subscriber can prove to the private key generator that the subscriber is old enough to view the movie.

The IBE policy attribute record 54 may contain sensitivity level information for each data attribute. For example, the IBE policy attribute record 54 may contain sensitivity level information in the subscriber number entry and may contain sensitivity level information in the rating entry, as shown in the example of FIG. 6. The sensitivity level information may be expressed explicitly (e.g., as a "sensitivity level") or implicitly (e.g., as an IBE layer attribute that specifies the order in which each attribute is to be used in layered IBE encryption schemes).

With the example of FIGS. 5 and 6, a two-level IBE encryption arrangement of the type set forth in expression 17 may be used to encrypt the movie data M. With this arrangement, the outer layer of the message is encrypted using IBE public key QL (the less-sensitive public key) and the inner layer of the message is encrypted using the IBE public key QG (the more-sensitive public key). As shown in the data structure 52 in which the movie data is embedded (or with which the movie data is at least associated), the movie to be encrypted in this example has an associated subscriber number of 2428667 (the particular recipient for whom the movie is intended). The movie has also a rating of "NC-17."

The data structure 52 has a corresponding IBE policy attribute record 54, which specifies how the data attributes of subscriber number and rating are to be used in forming the IBE public keys QL and QG. In particular, the record 54 sets forth access policy rules ("viewer subscriber number must match" and "must be old enough to view content of this rating") to be used for each of the IBE public keys.

The sensitivity information provided in record 54 may be used to determine which (if any) of the data attributes are sensitive and therefore should be placed in the inner layer of the two-layer IBE-encrypted message during message encryption by encryption engine 18. In this example, the record entries indicate that the rating attribute has a sensitivity of "high," whereas the subscriber number attribute has a sensitivity of "none." Using this information from the policy attribute record, it can be determined that the rating associated with the movie should be used in forming the more-sensitive IBE public key QG and that the subscriber number associated with the movie should be used in forming the less-sensitive IBE public key QL.

When the movie is encrypted using the format set forth in expression 17, the encryption engine 18 uses the embedded movie data from the data structure 52 and the values of the IBE public keys QG and QL as inputs. The associated information in the IBE policy attribute record 54 is also used by the encryption engine 18. In particular, the presence of an entry in the record 54 may be used to indicate that the listed data attribute is to be used in forming an IBE public key. The associated sensitivity level information in the record may be used by the encryption engine to determine how to order the IBE public keys (e.g., how many IBE encryption layers are to be used in encrypting the data and what order is to be used in encrypting the data, from most sensitive on the inner layers to least sensitive on the outer layers). A single IBE policy attribute record 54 of the type shown in FIG. 6 may be used to define the behavior associated with many individual data structures 52 (i.e., individual movies). Data structure 52 and record 54 may be provided to the sender using any suitable technique (e.g., electronically over network 14).

In the example of FIGS. 5 and 6, the sensitivity level information associated with each data attribute is used to ensure that the IBE public key QG (i.e., the rating of NC-17 in this example) is encrypted by the IBE public key QL according to expression 17, so that the potentially sensitive information in the ratings field need not be sent in the clear when the service provider distributes the encrypted movie to the subscriber.

The value of QG may be as shown in expression 18 and the value of QL may be as shown in expression 19.

QG="must be old enough to view rating NC-17" (18)

QL="subscriber number must match 2428667" (19)

As shown in expressions 18 and 19, the data structure attribute value rating=NC-17 and the corresponding access policy rule (i.e., the policy "must be old enough to view rating") may be used to form the IBE public key QG. Similarly, the data structure attribute value 2428667 and the corresponding policy rule "subscriber number must match" may be used to form the IBE public key QL.

The private key generator may use the policy aspects of the IBE public keys QL and QG in verifying whether or not a requesting recipient is authorized to access the encrypted data in the data structure. During the verification process, the recipient may provide credentials that establish the recipient's age and subscriber number to the satisfaction of the private key generator. If the recipient is authorized, the corresponding private keys are issued to the recipient and the recipient uses these private keys with decryption engine 20 to decrypt the message and access the embedded movie content.

Figure 7:
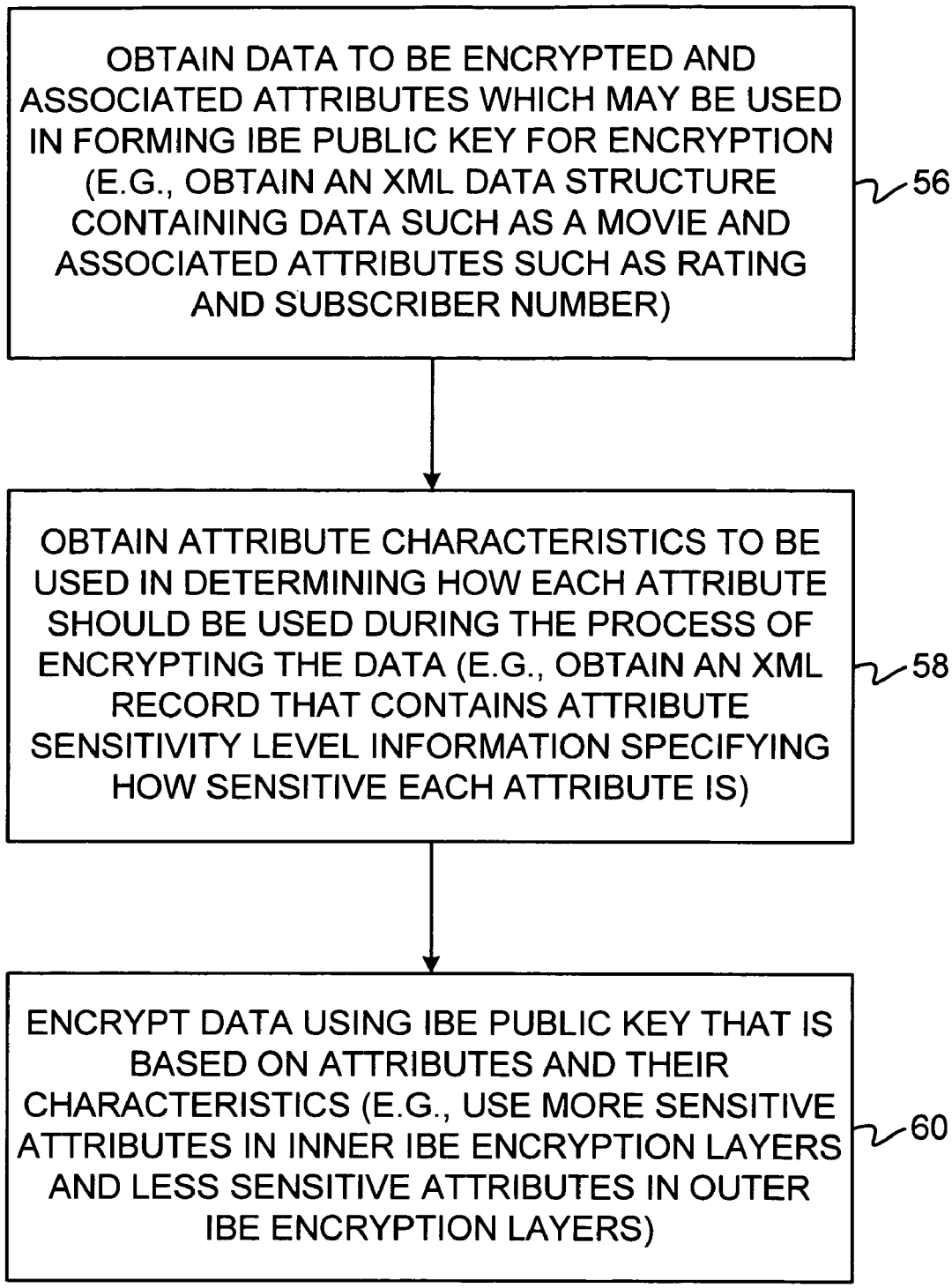
FIG. 7 is a flow chart of illustrative steps involved in using information such as the data attribute sensitivity information of the data record of FIG. 6 to encrypt data such as the data associated with the data structure of FIG. 5 in accordance with the present invention.

Illustrative steps involved in using a multi-layer IBE-encryption approach to securely distribute content are shown in FIG. 7. At step 56, the service provider (sender) obtains the data to be encrypted and the associated attributes (e.g., from a content provider). The data may be, for example, a movie, a song, text, images, code, or any other suitable media or content to be distributed by the service provider. The service provider also obtains information on the attributes of the data (e.g., from a content provider). For example, the service provider may obtain ratings data for a movie. If desired, an arrangement of the type described in connection with FIG. 5 may be used by the service provider. With the FIG. 5 arrangement, the movie data and the movie data attributes are provided in the form of an XML data structure.

At step 58 (which may be performed at the same time as step 56, before step 56, or after step 56), the service provider (sender) obtains information on the characteristics of the data attributes which may be used in determining how to encrypt the data. In the example of FIG. 6, the service provider obtains an XML IBE policy attribute record that specifies for each relevant data attribute (1) which access policy rule pertains to that attribute and (2) what the sensitivity level is for that data attribute. If desired, non-XML formats may be used to provide the service provider with information on which access policies are to be used for each type of data and how sensitive the various data attributes are. XML data records are described as an example.

The data and attributes may be provided in a single XML data structure 52 or other such data structure and the corresponding access policy and data attribute sensitivity information may be provided in a separate XML IBE policy attribute record 54 or other such record as described in connection with the example of FIGS. 5 and 6, or, if desired, the data, data attributes, access policy information and sensitivity information may be provided using any other suitable number of data structures, files, records, parameters, etc. The example of FIGS. 5 and 6 is merely illustrative.

After the information on the data attributes and sensitivity information has been obtained at step 58, the service provider (sender) may use encryption engine 18 to encrypt the data. Multiple layers of IBE encryption are used. The data attributes and access policy rules are used to form IBE public keys. The more sensitive public keys are used in the inner layers of the encrypted data (message) and the less sensitive IBE public keys are used in the outer layers of the encrypted data (message). Any suitable number of layers of IBE encryption may be used. IBE encryption may be performed using a nested approach in which the IBE-encrypted message payload M in the innermost layer is repeatedly re-encrypted using outer layers of IBE encryption. To avoid running the payload through he encryption algorithm unnecessarily, the payload may be encrypted once and the corresponding IBE public key that was used to encrypt the payload may itself be encrypted using IBE. This process of encrypting the inner layer IBE public keys with additional IBE public keys may be repeated for any suitable number of layers (e.g., two layers, three layers, four layers, more than four layers, etc.).

Because message key encryption using message keys such as symmetric message keys is generally more efficient than straight IBE encryption, one or more symmetric message keys may be used to encrypt the message (e.g., the main data payload may be encrypted with a symmetric key and, if desired, one or more of the IBE public keys may each be encrypted with a respective symmetric key).

When the encrypted message is sent from the service provider to the recipient(s) in the system, the information on the IBE public keys that were used to encrypt the message may be embedded within the encrypted message. As the recipient encrypts each layer of the message, another IBE public key is revealed, which the recipient can use in obtaining the corresponding IBE private key needed to decrypt the message. One or more of the IBE public keys may be omitted from the transmission from the sender to the recipient if the use of such IBE public keys is previously arranged or understood. For example, if it is known that the outermost layer (or an intermediate layer) will use the recipient's email address as at least part of the IBE public key during encryption, it is not necessary to transmit information on the email address of the recipient to the recipient with the message. The recipient can be assumed to already understand that the IBE decryption protocol in system 10 relies on use of the recipient's email address to decrypt this outer (or intermediate) layer. Because the recipient already knows the recipient's own email address, the recipient has sufficient information to query the private key generator for the private key corresponding to the email address (or to access a cached version of this private key) for use in decrypting the corresponding portion of the message.

The foregoing is merely illustrative of the principles of this invention and various modifications can be made by those skilled in the art without departing from the scope and spirit of the invention.

What is claimed is:

1. A method for using multi-layer identity-based encryption (IBE) to securely convey a message containing message data over a communications network from a sender to a recipient, comprising:
   at the sender, encrypting the message using at least two layers of IBE encryption by using an inner layer of message encryption having an associated inner-layer IBE public key to encrypt the message data and by using an outer layer of message encryption having an associated outer-layer IBE public key to encrypt the inner-layer IBE public key;
   sending the encrypted message to the recipient; and
   at the recipient, decrypting the encrypted message using an outer-layer IBE private key corresponding to the outer-layer IBE public key and using an inner-layer IBE private key corresponding to the inner layer IBE public key.

2. The method defined in claim 1 wherein using the outer layer of message encryption to encrypt the inner-layer IBE public key comprises encrypting the inner-layer IBE public key with the outer-layer IBE public key without using a symmetric key.

3. A method for using multi-layer identity-based encryption (IBE) to securely convey a message containing message data over a communications network from a sender to a recipient, comprising:
   at the sender, encrypting the message using at least two layers of IBE encryption by using an inner layer of message encryption having an associated inner-layer IBE public key to encrypt the message data and by using an outer layer of message encryption having an associated outer-layer IBE public key to encrypt the inner-layer IBE public key;
   sending the encrypted message to the recipient; and
   at the recipient, decrypting the encrypted message using an outer-layer IBE private key corresponding to the outer-layer IBE public key and using an inner-layer IBE private key corresponding to the inner layer IBE public key, wherein using the outer layer of message encryption to encrypt the inner-layer IBE public key comprises encrypting the inner-layer IBE public key with a symmetric key and encrypting the symmetric key with the outer-layer IBE public key.

4. The method defined in claim 3 wherein sending the encrypted message to the recipient comprises sending the encrypted inner-layer IBE public key to the recipient with the encrypted message, and wherein decrypting the encrypted message at the recipient further comprises using the outer-layer IBE private key in decrypting the encrypted inner-layer IBE public key to produce an unencrypted version of the inner-layer IBE public key at the recipient.

5. The method defined in claim 1 wherein encrypting the message comprises encrypting the message using at least three layers of IBE encryption and wherein the outer layer is not an outermost layer.

6. The method defined in claim 1 wherein encrypting the message comprises encrypting the message using a symmetric key.

7. The method defined in claim 6 wherein encrypting the message comprises encrypting the message data using the symmetric key and encrypting the symmetric key using the inner-layer IBE public key.

8. The method defined in claim 7 wherein encrypting the message further comprises encrypting the inner-layer IBE public key using the outer-layer IBE public key.

9. The method defined in claim 8 wherein the message data that has been encrypted using the symmetric key and the inner layer IBE public key that has been encrypted using the outer-layer IBE public key are sent to the recipient with the message and wherein decrypting the message at the recipient comprises:
   using the outer-layer IBE private key to decrypt the inner-layer IBE public key that has been encrypted using the outer-layer IBE public key;
   using inner-layer IBE private key to decrypt the symmetric key that has been encrypted using the inner-layer IBE public key; and
   using the symmetric key that has been decrypted using the inner-layer IBE private key to decrypt the message data that was encrypted using the symmetric key.

10. The method defined in claim 1 wherein the outer-layer IBE public key is less sensitive than the inner-layer IBE public key and wherein encrypting the message comprises using the outer-layer IBE public key to encrypt the inner-layer IBE public key to conceal the inner-layer IBE public key during transmission from the sender to the recipient.

11. The method defined in claim 10 wherein encrypting the message comprises encrypting the message using at least three layers of IBE encryption and wherein the outer layer is not an outermost layer.

12. The method defined in claim 1 wherein the message data is provided in an XML data structure containing data attributes of the message data, the method further comprising using at least some of the data attributes in forming the inner-layer IBE public key and the outer-layer IBE public key.

13. The method defined in claim 12 wherein at least one of the data attributes has an associated sensitivity level and wherein encrypting the message data comprises using the sensitivity level in determining how to encrypt the message.

14. The method defined in claim 13 further comprising:
   at the sender, obtaining information on the associated sensitivity level in the form of an XML record.

15. The method defined in claim 1 wherein the message comprises content having an age-based access policy criteria and wherein encrypting the message comprises using the age-based access criteria as at least part of the inner-layer IBE public key.

16. The method defined in claim 1 wherein encrypting the message comprises encrypting an email message.

17. The method defined in claim 1 wherein encrypting the message comprises encrypting an instant message.

18. The method defined in claim 1 wherein the inner-layer IBE public key and the outer-layer IBE public key have overlapping components and wherein encrypting the message comprises performing the inner layer of the message encryption using the inner-layer IBE public key that has overlapping components.

19. The method defined in claim 1 wherein encrypting the message further comprises using an additional-layer IBE public key to perform an additional layer of IBE encryption on the message, wherein the additional-layer IBE public key is less sensitive than the outer-layer IBE public key and is used to encrypt the outer-layer IBE public key.

20. The method defined in claim 19 wherein the inner-layer IBE public key, the outer-layer IBE public key, and the additional-layer IBE public key each have corresponding IBE public key components and wherein each IBE public key component in the additional-layer IBE public key is contained in the outer-layer IBE public key and wherein each IBE public key component in the outer-layer IBE public key is contained in the inner-layer IBE public key.

21. A method for using identity-based-encryption (IBE) to securely convey a message having message data M from a sender to a recipient over a communications network, comprising:

encrypting the message by performing at least an inner layer of IBE encryption and an outer layer of IBE encryption at the sender, wherein:

performing the inner layer of IBE encryption includes encrypting the message data M using a symmetric key S to produce encrypted message data Ms and encrypting the symmetric key S using an IBE public key QG associated with the inner layer of IBE encryption to produce an IBE-encrypted symmetric message key $S_{QG}$, and performing the outer layer of IBE encryption includes using a layer of message encryption having an associated IBE public key QL to encrypt the IBE public key QG, wherein the IBE public key QL is less sensitive than the IBE public key QG; and sending at least the encrypted message data $M_S$, the IBE-encrypted symmetric message key $S_{QG}$, and an encrypted version of the IBE public key QG to the recipient.

22. The method defined in claim 21 further comprising sending the IBE public key QL to the recipient.

23. The method defined in claim 21 wherein:

performing the outer layer of IBE encryption comprises encrypting the IBE public key QG using the IBE public key QL to produce an IBE-encrypted public key $QG_{QL}$; and sending the encrypted version of the IBE public key QG to the recipient comprises sending $QG_{QL}$ to the recipient.

24. The method defined in claim 21 wherein a symmetric key S' is used in performing the outer layer of IBE encryption by encrypting the IBE public key QG using the symmetric key S' to produce $QG_{S'}$.

25. The method defined in claim 24 wherein performing the outer layer of IBE encryption comprises encrypting the symmetric key S' with the IBE public key QL to produce an IBE-encrypted symmetric key $S'_{QL}$.

26. The method defined in claim 25 wherein sending the encrypted version of the IBE public key QG to the recipient comprises sending $QG_{S'}$ and $S'_{QL}$ to the recipient.

27. The method defined in claim 21 wherein the recipient has an identity and wherein the IBE public key QL is based on the recipient's identity, the method further comprising performing the outer layer of IBE encryption using the IBE public key QL that is based on the recipient's identity.

28. The method defined in claim 21 wherein the recipient has an email address and wherein the IBE public key QL is based on the recipient's email address, the method further comprising performing the outer layer of IBE encryption using the IBE public key QL that is based on the recipient's email address.

* * * * *